Jan. 16, 1968 G. R. BILLE 3,363,284
GLOVE MANDREL
Filed Oct. 30, 1964
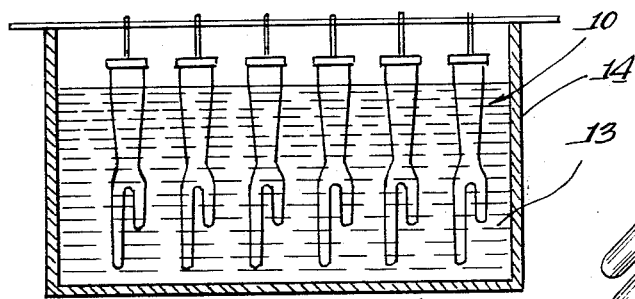
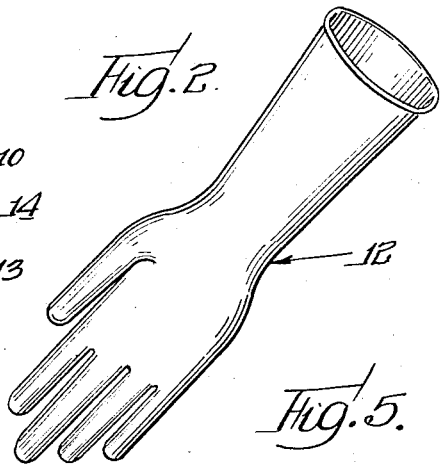
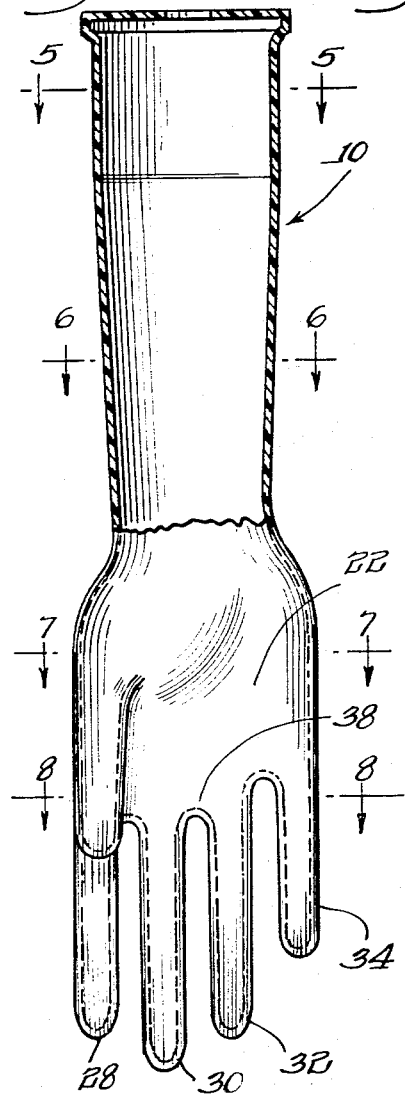
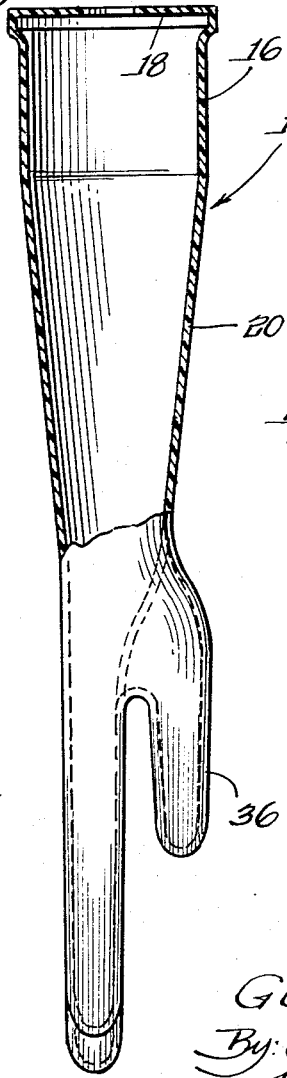
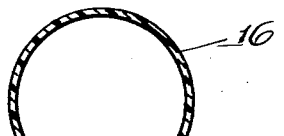
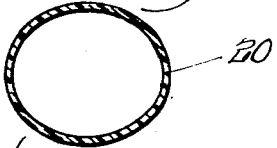
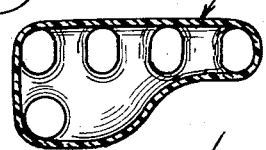
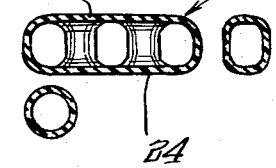
Inventor
Glen R. Bille
By: Olson, Trexler,
Wolters & Trexler attys.

United States Patent Office 3,363,284
Patented Jan. 16, 1968

3,363,284
GLOVE MANDREL
Glen R. Bille, North Canton, Ohio, assignor to Snyder Manufacturing Company, Inc., New Philadelphia, Ohio, a corporation of Ohio
Filed Oct. 30, 1964, Ser. No. 407,783
2 Claims. (Cl. 18—41)

ABSTRACT OF THE DISCLOSURE

The disclosure contemplates a dipping mandrel formed from plastic comprising epoxy and urethane providing a tough resilient thin-walled construction having good heat transfer characteristics. The mandrel has a configuration comprising a tapering wrist portion, a flattened palm portion and a plurality of spaced apart parallel finger and thumb portions.

---

The present invention relates to a novel mandrel or form for use in the manufacture of rubber goods by a dipping process, and more specifically to a novel glove mandrel.

While various structures and materials for dipping glove mandrels have heretofore been suggested, such mandrels have, in general, been made from ceramic material. The manufacture of ceramic glove mandrels has been expensive and the ceramic devices have been relatively fragile and subject to breakage.

An important object of the present invention is to provide a novel dipping mandrel and more specifically a relatively complicated dipping mandrel such as a glove mandrel which may be produced relatively economically and which is light in weight and relatively rugged and resistant to breakage.

Still another important object of the present invention is to provide a novel glove dipping mandrel having a relatively hard, smooth outer surface or skin for promoting the formation of smooth uniform rubber products and for facilitating stripping of the product from the mandrel, which mandrel also has relatively tough and resilient walls for resisting breakage.

Other objects and advantages of the present invention will become apparent from the following description and the accompanying drawings wherein:

FIG. 1 is a simplified view showing a plurality of dipping glove mandrels constructed in accordance with the features of the present invention immersed in a dipping tank;

FIG. 2 is a perspective view showing a glove formed by a mandrel incorporating features of the present invention;

FIG. 3 is an enlarged side view partially in cross section showing a glove mandrel incorporating features of the present invention in greater detail;

FIG. 4 is a partial sectional view taken generally along line 4—4 in FIG. 3;

FIG. 5 is a sectional view taken along line 5—5 in FIG. 3;

FIG. 6 is a sectional view taken along line 6—6 in FIG. 3;

FIG. 7 is a sectional view taken along line 7—7 in FIG. 3; and

FIG. 8 is a sectional view taken along line 8—8 in FIG. 3.

Referring now more specifically to the drawings wherein like parts are designated by the same numerals throughout the various figures, a glove dipping mandrel 10 incorporating features of the present invention is adapted to be used as shown in simplified manner in FIG. 1, for producing articles such as a rubber glove 12 shown in FIG. 2. More specifically one or more of the mandrels 10 may be dipped either manually or with the aid of automatic machinery into a bath 13 contained in a dipping tank 14, which bath comprises a dispersion of rubber or other suitable material from which the finished article is to be made.

The dipping mandrel 10 comprises a one-piece hollow body formed from plastic material as described more in detail below. The body comprises an arm portion 16 merging with a terminal end wall 18 and also merging with a tapering wrist portion 20. Preferably the arm portion 16 has a generally circular transverse cross section as shown in FIG. 5 while the wrist portion 20 has a generally elliptical cross section as shown in FIG. 6.

The wrist portion 20 merges with a palm section 22 having a relatively broad flat cross sectional configuration as indicated in FIGS. 7 and 8, and presenting front and back sidewalls 24 and 26. A forward margin 38 of the palm section merges with the finger portions 28, 30, 32 and 34. The glove mandrel is also provided with a thumb portion 36 which merges with the front wall 24 of the palm portion adjacent the junction between the palm portion and the wrist portion.

As shown best in FIGS. 3 and 4, the finger portions 28 through 34 are substantially straight and extend in substantially parallel and spaced relationship from the forward margin 38 of the palm portion 22. The thumb portion 36 is also substantially straight and while the other finger portions 28 through 34 are disposed within planes defining the opposite sides of the palm portion, the thumb portion 36 is spaced above the plane defining the flat wall 24 of the palm portion. Furthermore, the thumb portion 36 extends substantially parallel to the remaining finger portions. This arrangement not only facilitates proper production of the mandrel, but also enables the finished article or glove 11 to be stripped from the mandrel easily minimizing any possibility of injury to the article.

As shown best in FIGS. 7 and 8, the finger portions have generally rectangular but slightly rounded or elliptical cross sectional configurations and are arranged so that their major dimensions traverse the planes of the sidewalls 24 and 26 while their minor dimensions extend generally across the palm portion of the mandrel. This arrangement promotes greater spacing of the finger portions while providing the finger portions with sufficient circumference to form the finger elements of the glove 11 properly.

The mandrel is preferably formed from a mixture of epoxy and urethane resins and a suitable hardener or catalyst. When forming the mandrel, a quantity of the resin mixture is preferably heated and then poured into a previously heated mold. Then the mold is rotated, preferably in two directions, in a rotational casting apparatus of known construction so that the resinous material is rotationally cast within the mold. When the resinous material has hardened, the mold is open and the mandrel is removed and cured for a suitable length of time at an elevated temperature. While the resinous mixture and the temperatures utilized may be varied within reasonable limits, one resinous mixture which has been found to be satisfactory comprises 3.80 parts of an activatable epoxy resin which is a reaction product of epichlorohydrin and bis-phenol A, 2.10 parts of a partially reacted urethane resin which is a reaction product of polyether glycol and tolylene diisocyanate and 1.68 parts of a hardener which is 4.4′ methane-bis (2 chloroaniline) that reacts with the epoxy with two available hydrogens and reacts with the urethane with four available hydrogens to effect cross-linking between the epoxy and urethane.

In forming a mandrel with this material, it is desirable to heat the mold and the resinous material respectively to about 190 to 200 degrees F. before pouring the mixture into the mold and it is further desirable to cure the mandrel in an oven at an elevated temperature of about 260 degrees F. for about three hours after the mandrel has been removed from the mold.

The mandrel 10 rotationally cast as described above is hollow as shown in the drawings and the various portions of the mandrel have walls which are quite thin and of generally similar thickness throughout. The thin walls of the mandrel enable the mandrel to be relatively light in overall weight and also promote heat transfer through the mandrel for faster and more uniform curing of the rubber glove 12 during a glove forming operation. The resinous material of the mandrel is tough and sufficiently resilient so as to permit limited flexing of the various portions of the mandrel such as the finger portions relative to each other and thereby minimize any possibility of breakage. At the same time, the mandrel is stiff and heat resistant and has an extremely smooth, impervious outer surface layer or skin which is relatively hard possibly as a result of a more direct application of heat thereto by the mold and during curing of the mandrel so as to promote the formation of a glove 12 having a smooth uniform texture and generally uniform wall thickness. Furthermore, the surface of the mandrel is such as to minimize or substantially eliminate any localized buildup of coagulant on the mandrel during successive glove forming operations. As is known, such coagulant accumulation on ceramic mandrels heretofore in general use may cause the spots or uneven wall thicknesses in the gloves and frequently must be removed by cleaning the mandrel with a suitable material such as chromic acid.

While a preferred embodiment of the present invention has been shown and described herein it is obvious that many details may be changed without departing from the spirit and scope of the appended claims.

The invention is claimed as follows:

1. A dipping glove mandrel comprising a one-piece hollow thin-walled member of tough, stiff resinous plastic material, said member including a hollow wrist portion, a palm portion, a plurality of elongated relatively narrow hollow finger portions and an elongated relatively narrow hollow thumb portion, said finger and thumb portions extending along substantially parallel axes and in spaced relationship to each other from said palm portion, said member having a smooth, hard substantially impervious outer surface, said palm portion being relatively broad and flattened, said wrist portion being generally circular and tapering toward said palm portion, said palm portion having a width greater than the wrist portion, said finger portions extending from a forward margin of said palm portion and being located substantially entirely within planes defining opposite sides of said palm portion, said finger portions having transverse cross-sectional configurations which are elongated in a direction traversing said planes and are relatively narrow in a direction generally parallel to said planes for providing greater space between the finger portions, said thumb portion extending from one of said sides of the palm portion above and in substantial spaced relationship to one of said finger portions and having a generally circular transverse cross-sectional configuration.

2. A glove mandrel, as defined in claim 1, wherein said plastic material of said member comprises about 3.80 parts of an epoxy resin which is a reaction product of epichlorohydrin and bis-thenol A, 2.10 parts of a partially reacted urethane resin which is a reaction product of polyether glycol and tolylene diisocyanate and 1.68 parts of a hardener.

References Cited

UNITED STATES PATENTS

| 2,389,009 | 11/1945 | Tillotson | 18—41 |
| 2,503,358 | 4/1950 | Sidnell | 18—41 |
| 2,747,227 | 5/1956 | Reuter | 18—41 |
| 3,170,194 | 2/1965 | Abildgaard | 18—41 |
| 3,255,492 | 6/1966 | Velonis et al. | 18—41 |

J. SPENCER OVERHOLSER, *Primary Examiner.*